United States Patent Office 3,409,772
Patented Nov. 5, 1968

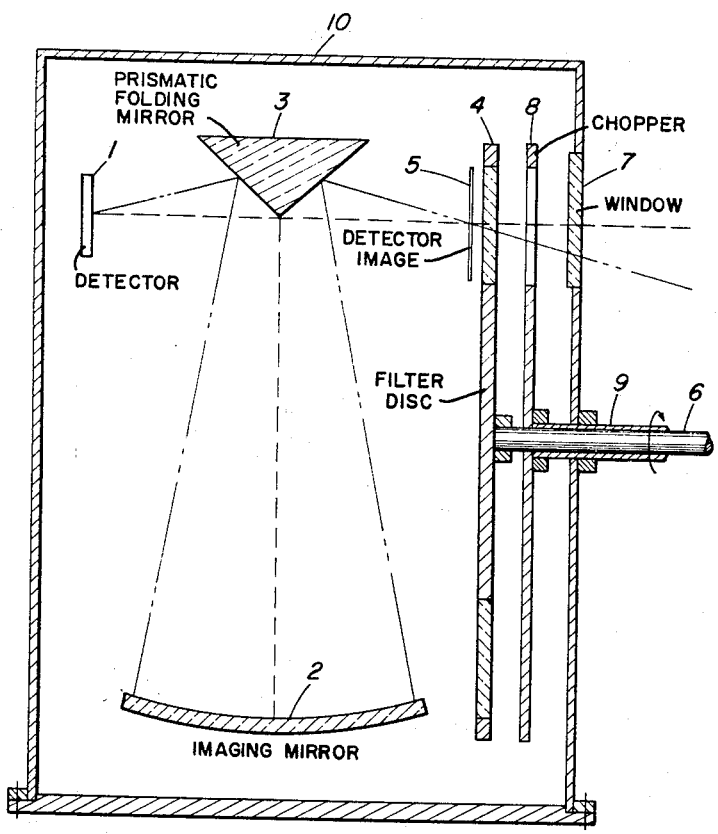

3,409,772
VERTICAL AIR TEMPERATURE GRADIENT DETERMINATION
Eric M. Wormser, Stamford, Conn., assignor to Barnes Engineering Company, Stamford, Conn., a corporation of Delaware
Filed Sept. 9, 1965, Ser. No. 486,147
8 Claims. (Cl. 250—83.3)

ABSTRACT OF THE DISCLOSURE

Infrared radiation coming down vertically through the atmosphere is spectrally scanned from the center of the carbon dioxide absorption band into the atmospheric window. Until the edge of the window is reached, the absorption of carbon dioxide results in radiation being received from near the surface of the earth at the peak absorption of carbon dioxide, for example $15\mu$, to radiation from higher and higher levels as the scan proceeds to shorter wavelengths. When the scan enters the atmospheric window at about $12.5\mu$ radiation is received from sources which are non-selective emitters, such as clouds. The temperatures in the carbon dioxide region define the lapse rate.

An instrument is also described constituting an infrared detector, collecting optics, a spectral scanning device such as a disc with different interference filters, and if desired, a chopper, the image of the detector passing through the elements recited and being sharply imaged on the scanning disc.

Background of the invention

A number of properties of the atmosphere are of interest to meteorologists and others, notably the lapse rate or lowering of temperature with altitude, temperature inversions, cloud heights, and even for certain purposes, determination of the altitude and/or temperature of the ozone layer in the atmosphere. For the most part these are properties of the atmosphere in the troposphere, although in the case of ozone this extends up into or beyond the stratosphere, and in the case of certain clouds they may also be located above the tropopause.

It has been proposed to examine from a satellite at a number of infrared wavelengths to determine the temperature of the tops of clouds, and to make measurements at certain atmospheric levels. However, the determinations proposed, and the instruments suggested, a multiple-slit grating spectrometer, have not been actually used in satellite flights, and they do not produce a continuous radiation gradient nor do they operate usefully in the troposphere where the most important measurements are needed, because it is this range of altitudes in which most meteorological phenomena take place.

Summary of the invention

The present invention scans from ground level continuously and repeatedly through a range of infrared from about the center of the $14\mu$ carbon dioxide band to about $10\mu$, or where ozone determinations are of importance, to about $9.6\mu$. When such a scan is made at about the middle of the carbon dioxide emission band, measurements are made only a few feet above the ground level, because the absorption of carbon dioxide molecules in the dense air is so high that a path length is soon reached beyond which no information is obtained because radiations at a greater distance are absorbed by the carbon dioxide molecules through which the radiations have to pass. As the scan moves through the infrared spectrum toward shorter wavelengths, the energy levels of carbon dioxide emission fall off rapidly, but, of course, predictably, as the carbon dioxide emission band is well known, and this fall-off in energy has been found to behave as if atmospheric pressure was reduced, and longer and longer paths of radiation reception result. Finally, as the scan passes beyond the carbon dioxide band and into the atmospheric window at about $10\mu$, no radiation is received from the atmosphere, or rather, space radiation is sensed in the absence of clouds. However, clouds are substantially opaque to infrared, and hence are good emitters. The scan, therefore, shows a sudden jump when a cloud is struck in the range of the atmospheric window, and the temperature of the bottom of the cloud is read. This can be translated into altitude of the bottom of the cloud if the lapse rate is known, as is often the case from other types of measurements. Or, if the altitude of the cloud is known, the lapse rate can be determined. Both types of information are of great importance to the meteorologist. Other information with respect to water vapor is possible, and if the scan extends to $9.6\mu$, measurements of the temperature or altitude of the ozone layer are possible.

It should be noted that the present invention differs from the proposals of satellite observations which remain in the carbon dioxide band, and the continuous scanning results in a signal which, in appropriate readout instruments such as an oscilloscope, can directly give a profile of atmospheric temperature. It should be noted that the scanning referred to is spectral scanning, that is to say, successive measurements at different wavelengths, continuously effected, and repeated. It is also possible to scan the field of view of the instrument as well, which can give a measure of relative cloud cover and/or cloud height. When there is a continuous overcast, of course, a measurement with spectral scan only is sufficient, as it will give cloud height and temperature, and visual observation gives direct information where there is a complete overcast.

It is desirable to effect chopping of the incoming radiation, which may be at a rate considerably higher than the spectral scan repetition rate. The chopping can be by conventional means, in which chopping blades alternately pass radiation and produce radiation from a reference source, either ambient or reflected black body. For many purposes comparison with a reference source at chopping frequency is not necessary, and the spectral scan, although slower than most chopping frequencies, is still sufficintly fast so that there is no significant change in instrument environmental temperature during a single scan. In a preferred aspect of the invention, particularly as it is concerned with a special type of instrument, it is possible to combine spectral scanning with calibration from reference sources at the beginning and end of a scan without involving separate elements.

The second aspect of the invention, namely a preferred instrument, will be described, although it should be understood that the process phase of the invention is not limited to the use of this particular type of scanner.

Brief description of the drawings

The drawings show in diagrammatic form an instrument for spectrally scanning infrared radiation.

Description of the preferred embodiments

In the drawings, a detector, preferably of elongated rectangular shape, is shown at 1. The detector is suitable for the range of infrared radiation in question, and may be a thermistor, thermocouple, or other known type. The detector is located at the center of curvature of a spherical mirror 2, using a prismatic element 3 as a folding mirror. On the other side of the instrument, the housing of which is shown at 10, there is located a variable filter disc 4 which is a form of interference filter the pass-band of which varies as the disc is rotated. However, in each tiny sector the interference filter is radially uniform, at least over its effective area. Since the filter disc is also at the center of curvature of the mirror 2, the detector 1 is imaged as a rectangular slit, the dimensions of which are determined by the detector. This is shown symbolically at 5 as being removed from the filter disc, although in practice, of course, the image is right on it.

The disc is rotated by a shaft 6 driven by a motor, (not shown). Incoming radiation enters through a window 7, and this is illustrated on the drawing as a path which the image of the detector takes. In its long dimension, the field of view may be, for example, about 20°, which is shown in the drawing. A narrower field of view can be produced by suitable fore-optics. A chopper 8 of the conventional butterfly type is also provided rotated by the shaft 9 at higher speed. The interference filter disc is also provided with a narrow mirror sector, so that the beginning and end of each scan, the detector receives reflected radiation from the instrument itself, which constitutes a reference source. In other words, the radiation is calibrated once every scan, which for most purposes is sufficient.

Movement of the instrument itself can be used to scan successively various parts of the sky. As such movements are not new with the present invention, they are not illustrated in the diagrammatic drawing.

Using a filter disc extending from about $15\mu$ to $10\mu$, the scan at first will give temperatures from a horizontal layer of the atmosphere only a few feet above the ground where the instrument is scanning, because at this wavelength in the middle of the carbon dioxide emission band, a comparatively short path of air is required in order to reach radiation equilibrium. As the scan proceeds to shorter and shorter wavelengths the absorption of $CO_2$ and hence the energy from each layer of the atmosphere becomes less and less and the total radiation becomes the sum of the radiation from more and more horizontal layers of the atmosphere and, therefore, from a longer and longer vertical path and temperature measurements at higher and higher altitudes can be derived. With suitable readouts, such as an oscilloscope or recorder for data storage and a suitable computation means a profile of the temperature is observed, recorded or computed.

The scan from $15\mu$ to $12.5\mu$ scanning from the center at $CO_2$ band to the edge of the atmospheric window can be used to determine lapse rate, while the scan from $11\mu$ to $10\mu$ in the window region will provide the temperature of the bottom of clouds. Hence the instrument will determine both vertical profile, (lapse rate), and cloud height.

To determine the vertical temperature profile in $n$ horizontal layers requires the solution of $n$ simultaneous equations giving $n$ measurements from $n$ wavelengths. Hence the data has to be processed in a suitable computer.

In another modification, the filter disc extends to about $9.6\mu$, and there is a cloudless sky it suddenly reaches the ozone band, and the temperatures can be determined, or again, if the lapse rate is known, the altitude.

The zone of very high air temperature above the stratosphere registers at a wavelength corresponding to a carbon dioxide mean path of the altitude in question. When this sharp rise in temperature is noted, the wavelength at which it occurs permits determination of the altitude directly, by suitable calibration of readouts such as oscilloscopes, recorders, and the like.

While the instrument of the preferred invention may also be used on satellites or other high-flying vehicles for looking down on the atmosphere, it is particularly useful in the process phase of the invention where the observations are from ground level up. Therefore, in its apparatus phase, the present invention is not limited to the preferred direction of observation.

If the vertical temperature structure of the atmosphere changes, i.e., if an inversion layer occurs, the instrument will note the change in shape of the radiation and by noting the wavelength at which this occurs the altitude of the inversion layer can be determined.

A scan from the $15\mu$ carbon dioxide band into the edge of an atmospheric window has been described. This is the preferred modification. However, similar results can be obtained by scanning from other carbon dioxide bands into a window, for example the band at $4.7\mu$ or at $2.7\mu$.

I claim:

1. A process of determining vertical atmospheric temperature profile which comprises measuring infrared radiation coming down vertically through the atmosphere at a plurality of adjacent infrared wavelengths from the center of the $14\mu$ infrared carbon dioxide absorption band into an adjacent infrared region in the atmospheric window, whereby a spectral scan of the infrared radiation results, and reading out the radiation intensity at the different wavelengths.

2. A process according to claim 1 in which the scan extends from $15\mu$ to approximately $10\mu$ in the atmospheric window and registers radiation from clouds if present.

3. A process according to claim 1 in which the scan extends to about $9.6\mu$ and includes temperature radiations at this extreme from the ozone layer in the atmosphere.

4. An apparatus for determining vertical atmospheric temperature gradient comprising, in combination and in optical alignment, means for receiving radiation, continuous spectral scanning means through a range from approximately the center of the $14\mu$ carbon dioxide band into the atmospheric window, a focusing mirror, a detector located at the focus of the mirror, a folding mirror between the detector and the focusing mirror, said mirror also reflecting the spectral scanning means at the focus of the mirror, whereby the detector is imaged on the spectral scanning means and the apparatus being aimable vertically upward to receive infrared radiation coming down vertically in the atmosphere.

5. An instrument according to claim 4 in which the spectral scanning means is an angularly varying interference filter disc, and the detector is of elongated shape, oriented with its long dimension imaged along a radius of the disc, thereby defining a slit.

6. An instrument according to claim 4 comprising means for chopping the incoming radiation.

7. An instrument according to claim 5 comprising means for chopping the incoming radiation.

8. An instrument according to claim 5 in which the interference filter disc is provided with a narrow mirror sector reflecting infrared radiation from the instrument walls onto the detector, and thus producing each scan a reference source radiation.

References Cited

UNITED STATES PATENTS 3,296,443   1/1967   Argyle _____ 250—83.3 X

RALPH G. NILSON, *Primary Examiner.*

A. B. CROFT, *Assistant Examiner.*